(12) United States Patent
Zhang et al.

(10) Patent No.: US 11,289,873 B2
(45) Date of Patent: Mar. 29, 2022

(54) LIDAR SYSTEMS AND METHODS FOR EXERCISING PRECISE CONTROL OF A FIBER LASER

(71) Applicant: INNOVUSION IRELAND LIMITED, Los Altos, CA (US)

(72) Inventors: Rui Zhang, Palo Alto, CA (US); Yimin Li, Cupertino, CA (US); Junwei Bao, Los Altos, CA (US); Yufeng Li, Mountain View, CA (US)

( * ) Notice: Subject to any disclaimer, the term of this patent is extended or adjusted under 35 U.S.C. 154(b) by 218 days.

(21) Appl. No.: 16/379,106

(22) Filed: Apr. 9, 2019

(65) Prior Publication Data

US 2020/0227882 A1    Jul. 16, 2020

Related U.S. Application Data

(60) Provisional application No. 62/654,943, filed on Apr. 9, 2018.

(51) Int. Cl.
| | |
|---|---|
| *H01S 3/091* | (2006.01) |
| *G01S 7/481* | (2006.01) |
| *H01S 3/067* | (2006.01) |
| *H01S 3/094* | (2006.01) |

(Continued)

(52) U.S. Cl.
CPC .......... *H01S 3/0912* (2013.01); *G01S 7/4814* (2013.01); *H01S 3/06716* (2013.01); *H01S 3/094003* (2013.01); *H01S 3/1608* (2013.01); *H01S 3/2308* (2013.01); *H01S 3/2375* (2013.01)

(58) Field of Classification Search
CPC ............... H01S 3/0912; H01S 3/06716; H01S 3/094003; H01S 3/1608; H01S 3/10046; H01S 3/094076; H01S 3/10015; H01S 3/1001; H01S 3/10038; H01S 3/06758;

(Continued)

(56) References Cited

U.S. PATENT DOCUMENTS

| | | |
|---|---|---|
| 4,464,048 A | 8/1984 | Farlow |
| 5,006,721 A | 4/1991 | Cameron et al. |
| 5,157,451 A | 10/1992 | Taboada |

(Continued)

FOREIGN PATENT DOCUMENTS

| | | |
|---|---|---|
| EP | 0 757 257 B1 | 5/2002 |
| EP | 1 237 305 A2 | 9/2002 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Xinning (Tom) Niu
(74) *Attorney, Agent, or Firm* — Mauriel Kapouytian Woods LLP; Liang Huang; Andrew A. Noble

(57) ABSTRACT

Embodiments discussed herein refer to LiDAR systems and methods that enable substantially instantaneous power and frequency control over fiber lasers. The systems and methods can simultaneously control seed laser power and frequency and pump power and frequency to maintain relative constant ratios among each other to maintain a relatively constant excited state ion density of the fiber laser over time.

22 Claims, 19 Drawing Sheets

(51) Int. Cl.
  *H01S 3/16* (2006.01)
  *H01S 3/23* (2006.01)
(58) Field of Classification Search
  CPC .. H01S 3/13013; H01S 3/2308; H01S 3/2375; G01S 7/4814; G01S 7/4818; G01S 7/484
  See application file for complete search history.

(56) References Cited

U.S. PATENT DOCUMENTS

| | | | |
|---|---|---|---|
| 5,442,358 A | 8/1995 | Keeler et al. | |
| 5,546,188 A | 8/1996 | Wangler et al. | |
| 5,579,153 A * | 11/1996 | Laming | H01S 3/06758 |
| | | | 359/337 |
| 5,657,077 A | 8/1997 | DeAngelis et al. | |
| 5,793,491 A | 8/1998 | Wangler et al. | |
| 5,838,239 A | 11/1998 | Stern et al. | |
| 5,926,259 A | 7/1999 | Bamberger | |
| 5,936,756 A | 8/1999 | Tomohiro | |
| 6,163,378 A | 12/2000 | Khoury | |
| 6,317,202 B1 | 11/2001 | Hosokawa et al. | |
| 6,594,000 B2 | 7/2003 | Green et al. | |
| 6,650,404 B1 | 11/2003 | Crawford | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,209,221 B2 | 4/2007 | Breed et al. | |
| 7,345,271 B2 | 3/2008 | Boehlau et al. | |
| 7,440,084 B2 | 10/2008 | Kane | |
| 7,440,175 B2 | 10/2008 | Di Teodoro et al. | |
| 7,489,865 B2 | 2/2009 | Varshneya et al. | |
| 7,576,837 B2 | 8/2009 | Liu et al. | |
| 7,649,616 B2 | 1/2010 | Michael et al. | |
| 7,724,423 B2 | 5/2010 | Bollond et al. | |
| 7,830,527 B2 | 11/2010 | Chen | |
| 7,835,068 B1 | 11/2010 | Brooks et al. | |
| 7,847,235 B2 | 12/2010 | Krupkin et al. | |
| 7,936,448 B2 | 5/2011 | Albuquerque et al. | |
| 7,969,558 B2 | 6/2011 | Hall | |
| 7,982,861 B2 | 7/2011 | Abshire et al. | |
| 8,072,582 B2 | 12/2011 | Meneely | |
| 8,270,440 B2 | 9/2012 | Mizuuchi et al. | |
| 8,471,895 B2 | 6/2013 | Banks | |
| 8,736,818 B2 | 5/2014 | Weimer et al. | |
| 8,749,764 B2 | 6/2014 | Hsu et al. | |
| 8,812,149 B2 | 8/2014 | Doak | |
| 8,994,928 B2 | 3/2015 | Shiraishi | |
| 9,048,616 B1 | 6/2015 | Robinson | |
| 9,086,273 B1 | 7/2015 | Gruver et al. | |
| 9,194,701 B2 | 11/2015 | Bosch | |
| 9,255,790 B2 | 2/2016 | Zhu | |
| 9,279,662 B2 | 3/2016 | Steffey et al. | |
| 9,300,321 B2 | 3/2016 | Zalik et al. | |
| 9,304,316 B2 | 4/2016 | Weiss et al. | |
| 9,316,724 B2 | 4/2016 | Gehring et al. | |
| 9,354,485 B2 | 5/2016 | Fermann et al. | |
| 9,510,505 B2 | 12/2016 | Halloran et al. | |
| 9,515,451 B2 | 12/2016 | Zayhowski et al. | |
| 9,541,377 B1 | 1/2017 | Yee et al. | |
| 9,575,184 B2 | 2/2017 | Gilliland et al. | |
| 9,605,998 B2 | 3/2017 | Nozawa | |
| 9,621,876 B2 | 4/2017 | Federspiel | |
| 9,638,799 B2 | 5/2017 | Goodwin et al. | |
| 9,680,280 B2 | 6/2017 | Natl et al. | |
| 9,696,426 B2 | 7/2017 | Zuk et al. | |
| 9,702,966 B2 | 7/2017 | Batcheller et al. | |
| 9,755,397 B2 | 9/2017 | Ogaki | |
| 9,823,353 B2 | 11/2017 | Eichenholz et al. | |
| 9,869,754 B1 | 1/2018 | Campbell et al. | |
| 9,880,263 B2 | 1/2018 | Droz et al. | |
| 9,880,278 B2 | 1/2018 | Uffelen et al. | |
| 9,885,778 B2 | 2/2018 | Dussan | |
| 9,897,689 B2 | 2/2018 | Dussan | |
| 9,915,726 B2 | 3/2018 | Bailey et al. | |
| 9,927,915 B2 | 3/2018 | Frame et al. | |
| 9,940,761 B2 | 4/2018 | Kundu et al. | |
| 10,042,159 B2 | 8/2018 | Dussan et al. | |
| 10,061,019 B1 | 8/2018 | Campbell et al. | |
| 10,073,166 B2 | 9/2018 | Dussan | |
| 10,094,925 B1 | 10/2018 | LaChapelle | |
| 10,137,903 B2 | 11/2018 | Tascione et al. | |
| 10,157,630 B2 | 12/2018 | Vaughn et al. | |
| 10,191,155 B2 | 1/2019 | Curatu | |
| 10,215,847 B2 | 2/2019 | Scheim et al. | |
| 10,295,656 B1 | 5/2019 | Li et al. | |
| 10,310,058 B1 | 6/2019 | Campbell et al. | |
| 10,324,170 B1 | 6/2019 | Engberg, Jr. et al. | |
| 10,324,185 B2 | 6/2019 | McWhirter et al. | |
| 10,393,877 B2 | 8/2019 | Hall et al. | |
| 10,429,495 B1 | 10/2019 | Wang et al. | |
| 10,451,716 B2 | 10/2019 | Hughes et al. | |
| 10,502,831 B2 | 12/2019 | Eichenholz | |
| 10,557,923 B2 | 2/2020 | Watnik | |
| 10,557,940 B2 | 2/2020 | Eichenholz et al. | |
| 10,571,567 B2 | 2/2020 | Campbell et al. | |
| 10,578,720 B2 | 3/2020 | Hughes et al. | |
| 10,591,600 B2 | 3/2020 | Villeneuve et al. | |
| 10,627,491 B2 | 4/2020 | Hall et al. | |
| 10,641,872 B2 | 5/2020 | Dussan et al. | |
| 10,663,564 B2 | 5/2020 | LaChapelle | |
| 10,663,585 B2 | 5/2020 | McWhirter | |
| 10,663,596 B2 | 5/2020 | Dussan et al. | |
| 10,684,360 B2 | 6/2020 | Campbell | |
| 10,908,262 B2 | 2/2021 | Dussan | |
| 10,969,475 B2 | 4/2021 | Li et al. | |
| 10,983,218 B2 | 4/2021 | Hall et al. | |
| 11,002,835 B2 | 5/2021 | Pan et al. | |
| 11,009,605 B2 | 5/2021 | Li et al. | |
| 11,022,688 B2 | 6/2021 | Eichenholz et al. | |
| 11,022,689 B2 | 6/2021 | Villeneuve et al. | |
| 11,025,885 B2 | 6/2021 | Pacala et al. | |
| 11,029,394 B2 | 6/2021 | Li et al. | |
| 11,029,406 B2 | 6/2021 | LaChapelle | |
| 2002/0136251 A1 | 9/2002 | Green et al. | |
| 2004/0135992 A1 | 7/2004 | Munro | |
| 2005/0033497 A1 | 2/2005 | Stopczynski | |
| 2005/0190424 A1 | 9/2005 | Reichenbach et al. | |
| 2005/0195383 A1 | 9/2005 | Breed et al. | |
| 2006/0071846 A1 | 4/2006 | Yanagisawa et al. | |
| 2006/0132752 A1 | 6/2006 | Kane | |
| 2007/0091948 A1 | 4/2007 | Di Teodoro et al. | |
| 2007/0216995 A1 | 9/2007 | Bollond et al. | |
| 2008/0174762 A1 | 7/2008 | Liu et al. | |
| 2009/0010644 A1 | 1/2009 | Varshneya et al. | |
| 2009/0051926 A1 | 2/2009 | Chen | |
| 2009/0059201 A1 | 3/2009 | Willner et al. | |
| 2009/0067453 A1 | 3/2009 | Mizuuchi et al. | |
| 2009/0147239 A1 | 6/2009 | Zhu et al. | |
| 2009/0262760 A1 | 10/2009 | Krupkin et al. | |
| 2009/0316134 A1 | 12/2009 | Michael et al. | |
| 2010/0006760 A1 | 1/2010 | Lee et al. | |
| 2010/0020306 A1 | 1/2010 | Hall | |
| 2010/0027602 A1 | 2/2010 | Abshire et al. | |
| 2010/0045965 A1 | 2/2010 | Meneely | |
| 2010/0053715 A1 | 3/2010 | O'Neill et al. | |
| 2010/0128109 A1 | 5/2010 | Banks | |
| 2010/0271614 A1 | 10/2010 | Albuquerque et al. | |
| 2012/0038903 A1 | 2/2012 | Weimer et al. | |
| 2012/0124113 A1 | 5/2012 | Zalik et al. | |
| 2012/0221142 A1 | 8/2012 | Doak | |
| 2013/0107016 A1 | 5/2013 | Federspiel | |
| 2013/0116971 A1 | 5/2013 | Retkowski et al. | |
| 2013/0293867 A1 | 11/2013 | Hsu et al. | |
| 2013/0293946 A1 | 11/2013 | Fermann et al. | |
| 2013/0329279 A1 | 12/2013 | Nati et al. | |
| 2014/0078514 A1 | 3/2014 | Zhu | |
| 2014/0347650 A1 | 11/2014 | Bosch | |
| 2014/0350836 A1 | 11/2014 | Stettner et al. | |
| 2015/0078123 A1 | 3/2015 | Batcheller et al. | |
| 2015/0084805 A1 | 3/2015 | Drawber | |
| 2015/0109603 A1 | 4/2015 | Kim et al. | |
| 2015/0116692 A1 | 4/2015 | Zuk et al. | |
| 2015/0139259 A1 | 5/2015 | Robinson | |
| 2015/0338270 A1 | 11/2015 | Williams et al. | |
| 2015/0355327 A1 | 12/2015 | Goodwin et al. | |

(56) References Cited

U.S. PATENT DOCUMENTS

| | | |
|---|---|---|
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | mcCloskey et al. |
| 2016/0100521 A1 | 4/2016 | Halloran et al. |
| 2016/0117048 A1 | 4/2016 | Frame et al. |
| 2016/0172819 A1* | 6/2016 | Ogaki ............... H01S 3/10015 219/121.8 |
| 2016/0178736 A1 | 6/2016 | Chung |
| 2016/0226210 A1* | 8/2016 | Zayhowski ........... H01S 3/0085 |
| 2016/0245902 A1 | 8/2016 | Watnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1* | 6/2017 | Villeneuve ............ G01S 7/4804 |
| 2017/0307738 A1 | 10/2017 | Schwarz et al. |
| 2017/0311620 A1 | 11/2017 | Eichenholz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0210084 A1 | 7/2018 | Zwölfer et al. |
| 2018/0275274 A1 | 9/2018 | Bao et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0227862 A1 | 7/2020 | Schnieder |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 2000411 A | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 2012-0013515 A | 2/2012 |
| KR | 2013-0068224 A | 6/2013 |
| KR | 2018-0107673 A | 10/2013 |
| WO | 2017/110417 A1 | 6/2017 |
| WO | 2018/125725 A1 | 7/2018 |
| WO | 2018/129408 A1 | 7/2018 |
| WO | 2018/129409 A1 | 7/2018 |
| WO | 2018/129410 A1 | 7/2018 |
| WO | 2018/175990 A1 | 9/2018 |
| WO | 2018/182812 A2 | 10/2018 |
| WO | 2019/079642 A1 | 4/2019 |
| WO | 2019/165095 A1 | 8/2019 |
| WO | 2019/165289 A1 | 8/2019 |
| WO | 2019/165294 A1 | 8/2019 |
| WO | 2020/013890 A2 | 1/2020 |

OTHER PUBLICATIONS

"Fiber laser," Wikipedia, https://en.wikipedia.org/wiki/FiberJaser, 6 pages.

European Search Report, dated Jun. 17, 2021, for EP Application No. 18868896.4, 7 pages.

European Search Report, dated Jul. 17, 2020, for EP Application No. 18776977.3, 12 pages.

Extended European Search Report, dated Jul. 10, 2020, for EP Application No. 18736738.8, 9 pages.

Extended European Search Report, dated Jul. 22, 2020, for EP Application No. 18736685.1, 10 pages.

International Search Report and Written Opinion, dated Mar. 19, 2018, for International Application No. PCT/US2018/012705, 12 pages.

Gluckman, J, (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, pp. 983203-983203.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

Gunzung, Kim, et al. (Mar. 2, 2016). "A hybrid 3D LIDAR Imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

International Preliminary Report on Patentability, dated Apr. 30, 2020, for International Application No. PCT/US2018/056577, 8 pages.

International Preliminary Report on Patentability, dated Jul. 9, 2019, for International Application No. PCT/US2018/012705, 7 pages.

International Search Report and Written Opinion, dated Jul. 9, 2019, for international Application No. PCT/US2019/018987, 17 pages.

International Search Report and Written Opinion, dated May 3, 2019, for International Application No. PCT/US2019/019272, 16 pages.

International Search Report and Written Opinion, dated May 6, 2019, for PCT Application No. PCT/US2019/019264, 15 pages.

International Search Report and Written Opinion, dated Jan. 3, 2019, for International Application No. PCT/US2018/056577, 15 pages.

International Search Report and Written Opinion, dated Sep. 18, 2018, for International Application No. PCT/US2018/012116, 12 pages.

International Search Report and Written Opinion, dated Mar. 23, 2018, for International Application No. PCT/US2018/012704, 12 pages.

International Search Report and Written Opinion, dated Jan. 17, 2020, for international Application No. PCT/US2019/019276, 14 pages.

International Preliminary Report on Patentability, dated Sep. 3, 2020, for International Application No. PCT/US2019/019030, 10 pages.

(56) References Cited

OTHER PUBLICATIONS

International Preliminary Report on Patentability, dated Dec. 24, 2020, for International Application No. PCT/US2019/036779, 12 pages.
International Preliminary Report on Patentability, dated Oct. 13, 2020, for International Application No. PCT/US2019/026520, 7 pages.
International Preliminary Report on Patentability, dated Oct. 13, 2020, for International Application No. PCT/US2019/026547, 8 pages.
International Search Report and Written Opinion, dated Mar. 16, 2020, for International Application No. PCT/US2019/061256, 10 pages.
International Search Report and Written Opinion, dated Jun. 12, 2019, for International Application No. PCT/US2019/019030, 13 pages.
International Search Report and Written Opinion, dated Jan. 22, 2020, for International Application No. PCT/US2019/021179, 10 pages.
International Search Report and Written Opinion, dated Aug. 5, 2019, for International Application No. PCT/US2019/026520, 11 pages.
International Search Report and Written Opinion, dated Jul. 24, 2019, for International Application No. PCT/US2019/026547, 12 pages.
International Search Report and Written Opinion, dated Oct. 11, 2019, for International Application No. PCT/US2019/036779, 15 pages.
International Search Report and Written Opinion, dated Jun. 7, 2018, for International Application No. PCT/US2018/024185, 9 pages.
International Search Report and Written Opinion, dated Mar. 20, 2018, for International Application No. PCT/US2018/012703, 13 pages.
U.S. Appl. No. 16/595,904, filed Oct. 8, 2019.
U.S. Appl. No. 16/295,803, filed Mar. 7, 2019.
U.S. Appl. No. 16/546,702, filed Aug. 21, 2019.

* cited by examiner $$\frac{\partial n_2}{\partial t} = k_p \cdot P_p \cdot n_1 - k_{se} P_s n_2 + k_{sa} P_s n_1 - \frac{n_2}{T_1}$$

$$n_2 = \frac{N_2}{N_t} \quad ; \quad n_1 = 1 - n_2$$

$$k_p = \frac{\Gamma_p \sigma_p}{a_p h \gamma_p} \quad ; \quad k_{se} = \frac{\Gamma_s \cdot \sigma_{se}}{a_s h \gamma_s} \quad ; \quad k_{sa} = \frac{\Gamma_s \cdot \sigma_{sa}}{a_s h \gamma_s}$$

$$\frac{n_2}{T_1} + k_{se} P_s n_2 = k_p P_p \cdot (1 - n_2) + k_{sa} P_s \cdot (1 - n_2)$$

$$\Rightarrow \quad n_2 = \frac{k_p P_p + k_{sa} P_s}{\frac{1}{T_1} + k_{se} P_s + k_p P_p + k_{sa} P_s} \tag{1}$$

$$\frac{dP_p}{dz} = -\Gamma_p \sigma_p N_t \cdot n_1 \cdot P_p$$

$$= -\Gamma_p \cdot \sigma_p \cdot N_t \cdot P_p \cdot \frac{\frac{1}{T_1} + k_{se} \cdot P_s}{\frac{1}{T_1} + k_{se} P_s + k_p P_p + k_{sa} \cdot P_s} \tag{2}$$

$$\frac{dP_s}{dz} = P_s \Gamma_s \cdot \sigma_{se} n_2 N_t - P_s \cdot \Gamma_s \sigma_{sa} n_1 N_t \tag{3}$$

FIG. 6B $$\frac{\partial n_2}{\partial t} = k_p P_p n_1 - k_{se} P_s n_2 + k_{sa} P_s n_1 \qquad (4)$$

$$\frac{dP_p}{dz} = -\Gamma_p \sigma_p N_t n_1 P_p \qquad (5)$$

$$\frac{dP_s}{dz} = \Gamma_s \sigma_{se} N_t n_2 P_s - \Gamma_s \sigma_{sa} N_t n_1 P_s \qquad (6)$$

$$\frac{\partial n_2}{\partial t} = \frac{\partial (1-n_1)}{\partial t} = \frac{\partial n_1}{\partial t} = 0 \qquad (7)$$

$$P_p = P_p(P_s) = \frac{1}{k_p(1-n_2)}[(k_{se}+k_{sa}) \cdot n_2 - k_{sa}]P_s \qquad (8)$$

FIG. 6C

LIDAR SYSTEMS AND METHODS FOR EXERCISING PRECISE CONTROL OF A FIBER LASER

CROSS-REFERENCE TO A RELATED APPLICATION

This application claims the benefit of U.S. Provisional Application No. 62/654,943, filed Apr. 9, 2018, the disclosure of which is incorporated herein in its entirety.

FIELD OF THE INVENTION

The present disclosure relates to light detection and ranging (LiDAR), and in particular to LiDAR systems and methods for precisely controlling a fiber laser.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. LiDAR systems, for example, can provide the sensory input required by a semi-autonomous or fully autonomous vehicle. LiDAR systems can use a fiber laser that serves as the source of light pulses that are projected by the LiDAR system.

BRIEF SUMMARY

Embodiments discussed herein refer to LiDAR systems and methods for precisely controlling a fiber laser. The systems and methods can simultaneously control seed laser power and frequency and pump power and frequency to maintain relative constant ratios among each other to maintain a relatively constant excited state ion density of the fiber laser over time.

In one embodiment, a light detection and ranging (LiDAR) system is provided that can include a fiber laser having an excited state ion density. The fiber laser can include a seed laser and a pump. The LiDAR system can include seed driver circuitry coupled to the seed laser, pump driver circuitry coupled to the pump, and control circuitry coupled to the seed driver circuitry and the pump driver circuitry. The control circuitry is operative to control operation of the seed driver circuitry and the pump driver circuitry to maintain the excited state ion density substantially constant over time.

In one embodiment, a light detection and ranging (LiDAR) system is provided that can include a fiber laser having an excited state ion density. The fiber laser can include a seed laser and a pump. The LiDAR system can include seed driver circuitry coupled to the seed laser and operative to control seed power, pump driver circuitry coupled to the pump and operative to control pump power, and control circuitry coupled to the seed driver circuitry and the pump driver circuitry, the control circuitry is operative to control a ratio between the seed power and the pump power such that the excited state ion density is maintained substantially constant over time.

In one embodiment, a method implemented in a light detection and ranging (LiDAR) system comprising a fiber laser comprising a seed laser and a pump, is provided. The method can include modulating seed power output of the seed laser, modulating pump power output of the pump, and controlling a ratio between the seed power output and the pump power output such that an excited state ion density of the fiber laser is maintained substantially constant over time.

A further understanding of the nature and advantages of the embodiments discussed herein may be realized by reference to the remaining portions of the specification and the drawings.

BRIEF DESCRIPTION OF THE DRAWINGS

FIGS. 6B and 6C show several equations illustrating rate equations of fiber amplifiers, according to various embodiments;

DETAILED DESCRIPTION

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
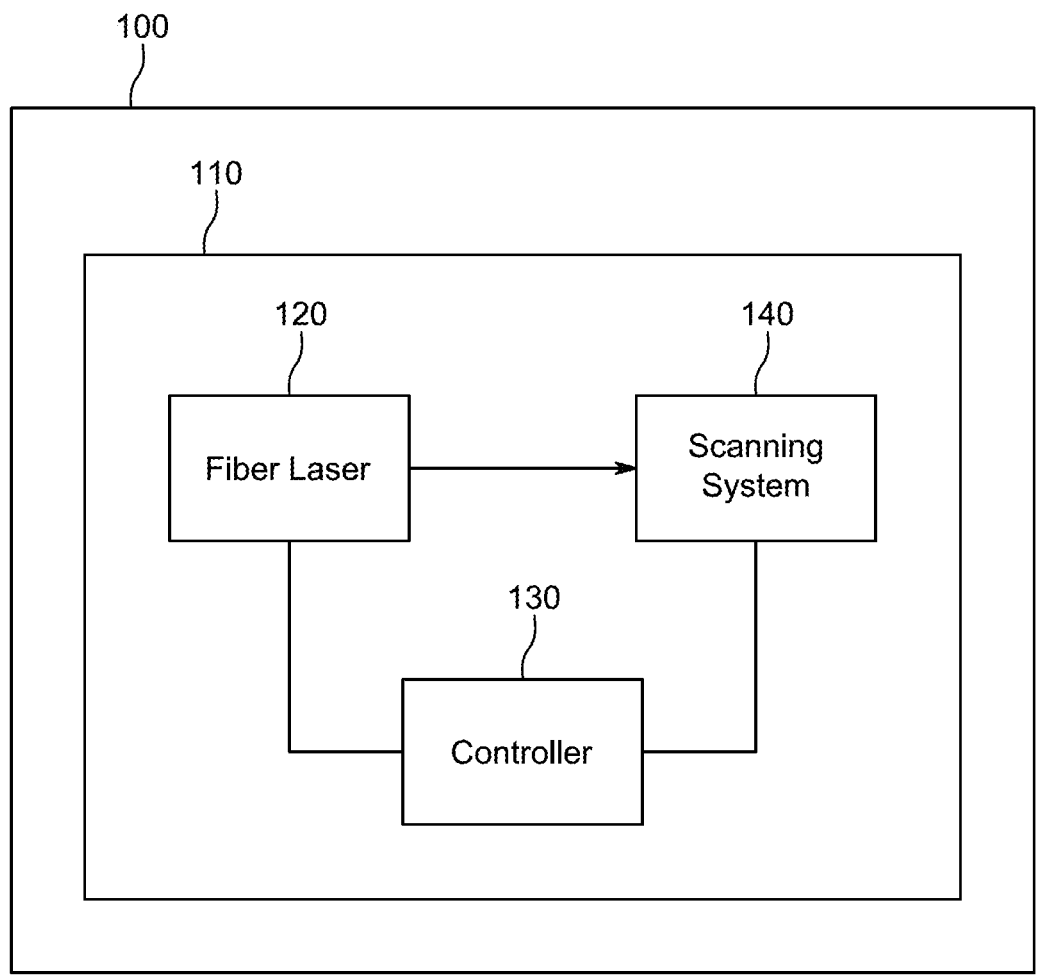
FIG. 1 shows an illustrative vehicle having a LiDAR system that is attached to and/or incorporated therein, according to an embodiment.

FIG. 1 shows an illustrative vehicle 100 having a LiDAR system 110 that is attached to and/or incorporated therein according to an embodiment. Vehicle 100 can be an automobile, a truck, a drone, a plane, a robot, a hand-held device, a stationary device, or any other suitable platform on which LiDAR system 110 can be used. LiDAR system 110 can be fully contained within an interior portion of vehicle 100, mounted to an exterior portion of vehicle 100, or contained partially within the interior portion and partially mounted to the exterior. Interior portions may be portions of vehicle 100 that are not directly exposed to external environmental factors such as the environment conditions (e.g., water, humidity, sun, ice, wind, etc.) and road conditions (e.g., road debris). The interior portion may be influenced by external environment conditions but to a lesser degree than the exterior portion.

LiDAR system 110 may include, among other features, fiber laser 120, controller 130, and scanning system 140. Fiber laser 120 may be any suitable laser that uses a seed laser and at least one amplifier and also includes an active gain medium that is rare-earth ion doped. Controller 130 may be operative to control LiDAR system 110. For example, controller 130 may control operating parameters of fiber laser 120. Scanning system 140 may include the appropriate lenses, mirrors, steering optics, and detectors needed to capture an image of a scene existing within a vicinity of vehicle 100. Fiber laser 120 serves as the source of light pulses that are provided to scanning system 140. Scanning system 140 can control projection of those light pulses in accordance with a field of view of scanning system 140. The field of view includes lateral and vertical fields of view in which laser pulses are transmitted to capture an X×Y image every scan cycle. This X×Y image is obtained each scan cycle and any objects detected with the image are detected by returns of the laser pulses. The images are processed by software to determine the location and distance of the objects.

Figure 2:
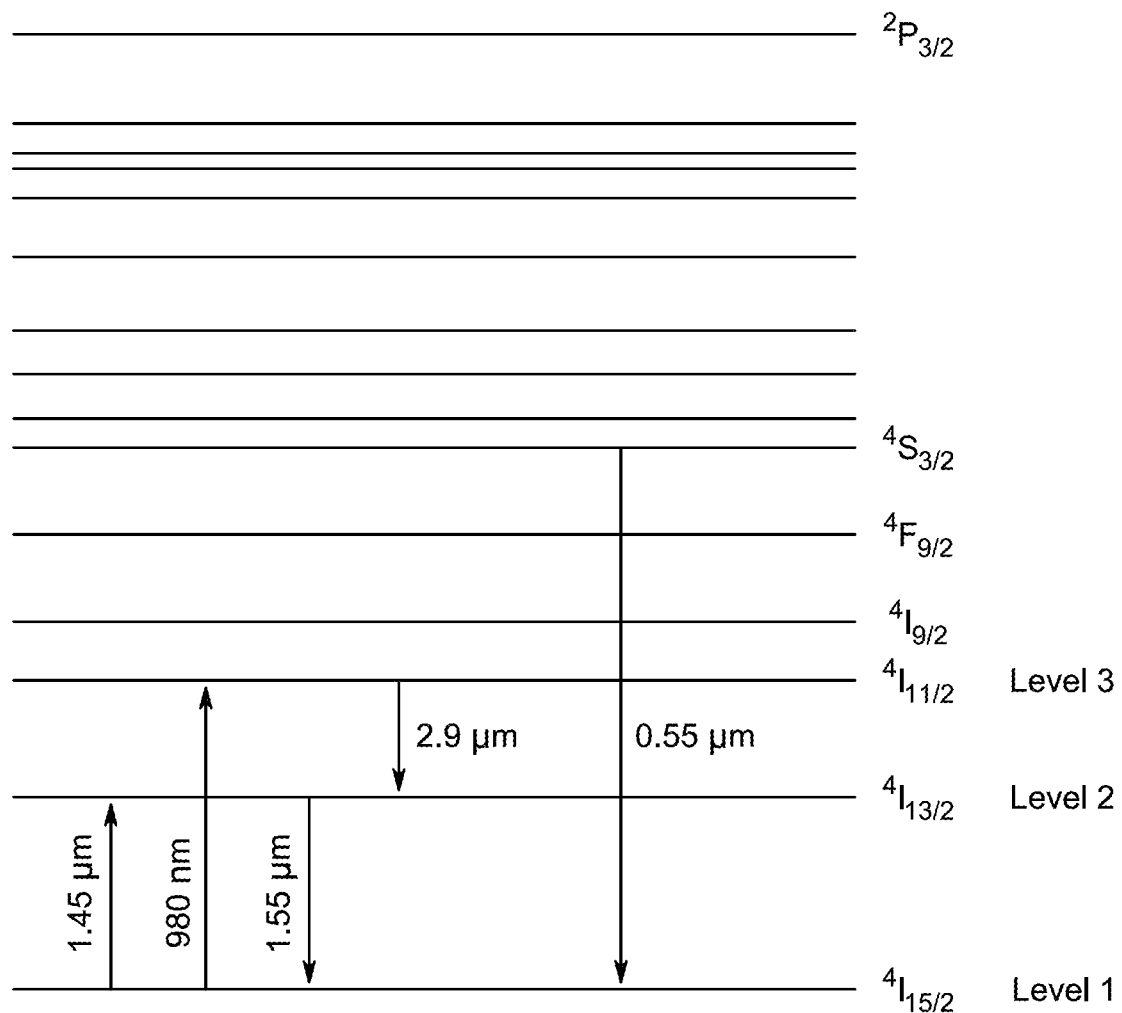
FIG. 2 shows illustrative energy levels of fiber laser according to an embodiment.

Conventional fiber lasers are limited in their ability to rapidly change operating characteristics of their output laser. These limitations are now discussed. FIG. 2 shows an illustrative energy level structure of an Erbium ion fiber laser operating at 980 nm. The fiber laser pumps ions from the ground state (level 1) into level 3. From there, ions in the fiber glass quickly decay to level 2 by rapid multi-photon transitions (usually within a few microseconds). The upper laser level (level 2) is quite long-lived, with an upper-state lifetime on the order of 10 ms for an Erbium-doped amplifier. Due to the long lifetime of the amplifier, the fiber can store energy and amplify the pulsed signal without much pulse to pulse variation. A couple of disadvantages are apparent in fiber lasers such as those that exhibit energy level structures similar that shown in FIG. 2. One disadvantage is that the output or pulse average power of the fiber laser is saturated by pump power. This results in an output signal power that does not adequately respond to an input signal. For example, consider a scenario that assumes that the input power is 20 mW, pump power is 8 W, pump wavelength is ~980 nm, signal wavelength is 1550 nm, and signal repetition rate is 1 MHz. Further assume that the fiber includes a Nufern double cladding fiber of MM-EYDF-12/130-HE and a fiber length of 2 meters. A simulation result shows the output signal power is 1.8 W. If the input signal is increase to 40 mW, a simulation result shows that the output power is 1.82 W, 2 hundredths of a watt higher in response two fold increase in input power. This shows that the output is not strongly correlated to an input signal because the output signal is primarily controlled by saturation of the pump.

Figure 3:
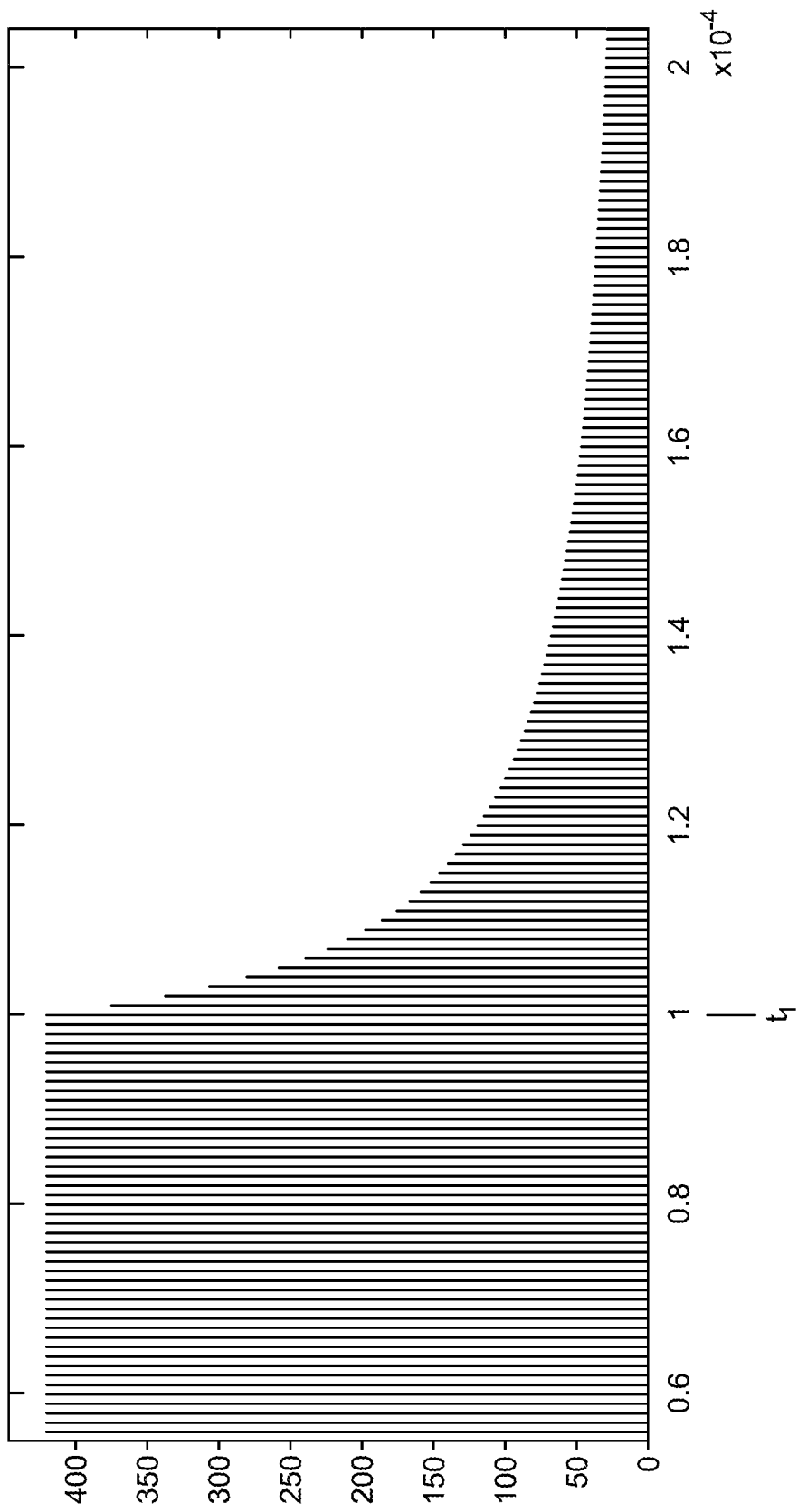
FIG. 3 illustrates output power versus time when pump power is suddenly turned off.

Another disadvantage is that the output of the fiber laser cannot respond to its pump power instantly. This prevents the output signal power from being adjusted on a pulse to pulse basis in response to changes in pump power. For example, assuming the same parameters of the fiber laser in the example above, FIG. 3 illustrates output power versus time when pump power is suddenly turned off at time, $t_1$. FIG. 3 shows that the output signal does not return to zero immediately but reduces gradually. It takes approximately ten microseconds to return to 10% of original output power level. Both of these disadvantages are unacceptable limitations for fiber laser based LiDAR systems being used, for example, in vehicles. Embodiments discussed herein eliminate the disadvantages.

Figure 4:
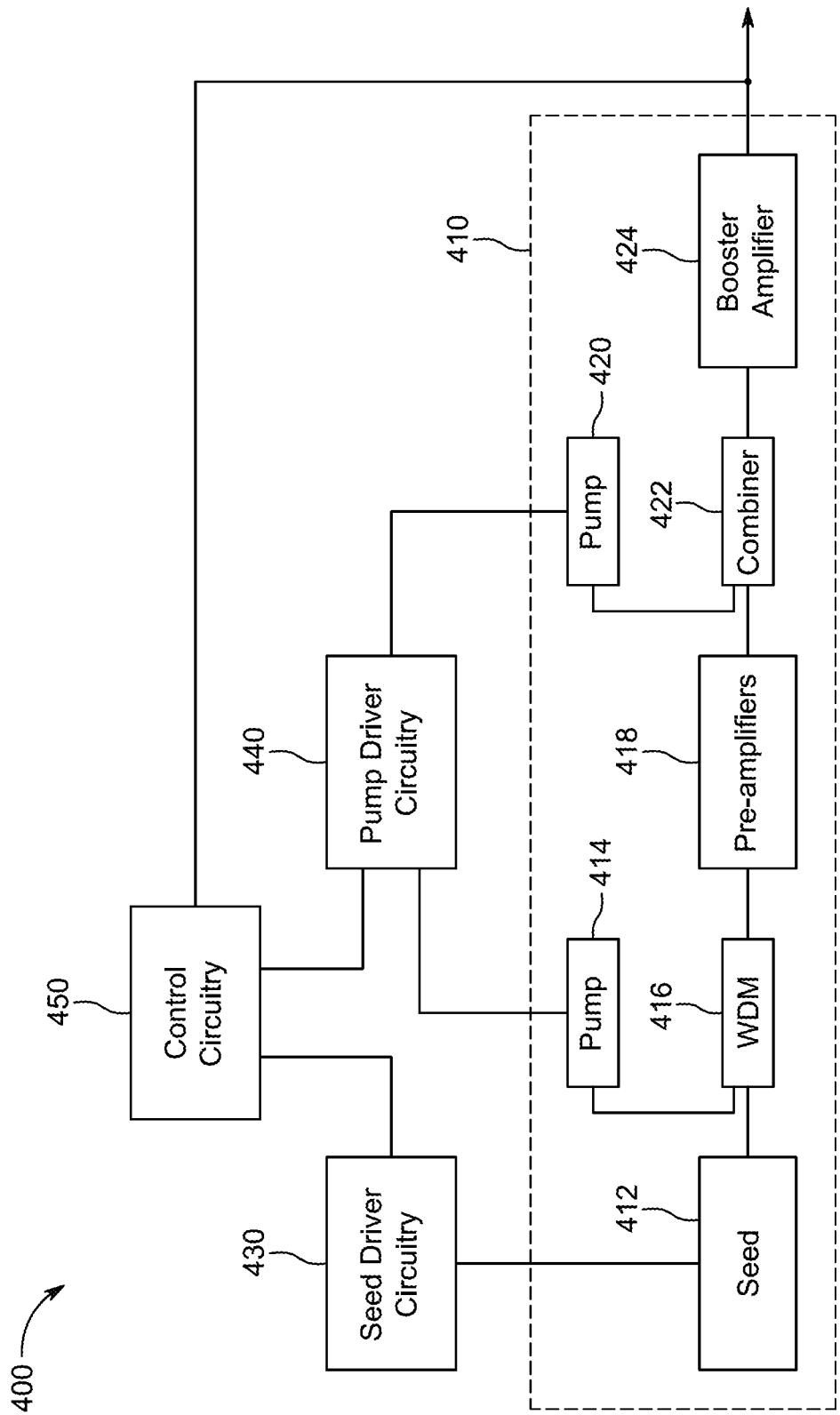
FIG. 4 shows illustrative fiber laser system according to an embodiment, according to an embodiment.

FIG. 4 shows illustrative fiber laser system 400 according to an embodiment. Fiber laser system 400 can include fiber laser 410, seed driver circuitry 430, pump driver circuitry 440, and control circuitry 450. In one embodiment, fiber laser 400 can include a seed laser and at least one stage of an amplifier. In other embodiments, an amplified spontaneous emission (ASE) filter can be positioned downstream of the amplifier. In the embodiment shown in FIG. 4, fiber laser 410 can include seed laser 412, pump 414, wavelength division multiplexor 416, pre-amplifier 418, pump 420, combiner 422, and booster amplifier 424. Fiber laser 400 also can include amplified spontaneous emission (ASE) filter (not shown), which can be located downstream from pre-amplifier 418 or downstream from booster amplifier 424. During operation, the output of seed laser 412 is amplified through a combination of pump 414, wavelength division multiplexor 416, pre-amplifier 418, pump 420, combiner 422, and booster amplifier 424. ASE is created as a byproduct of the operation of fiber laser 400 and it exists for a range of wavelengths, including desired and undesired wavelengths. The ASE filter can filter out the out of band residual ASE energy.

Seed driver circuitry 430 can control operation of seed laser 412. For example, seed driver circuitry 430 can control power output, repetition rate, and any other factor associated with seed laser 412. Pump driver circuitry 440 can control operation of pumps 414 and 420. For example, pump driver circuitry 440 can control power output and any other factor associated with pumps 414 and 420. Control circuitry 450 can control operation of seed driver circuitry 430 and pump driver circuitry 440. Control circuitry 450, and its control over seed driver circuitry 430 and pump driver circuitry 440, can exercise control over a fiber laser in ways not capable in conventional systems. Embodiments discussed herein enable dynamic adjustment of pulse intensity on a pulse-to-pulse basis. That is, the power output of a fiber laser can be changed to any desired power output level instantaneously. For example, if the power output is operating at 50% of maximum, control circuitry 450 can instruct seed and pump driver circuitries 430 and 440 adjust their operating parameters so that the output is set to 100% of max or 0.1% of max during the next pulse. Embodiments discussed herein also enable power savings by selectively deactivating pumps (e.g., pumps 414 and 420) or at least substantially reducing their power output on a selective basis. Embodiments discussed herein also enable the repetition rate or pulse-to-pulse frequency to be dynamically changed without affecting the output power of the fiber laser.

Figure 5:
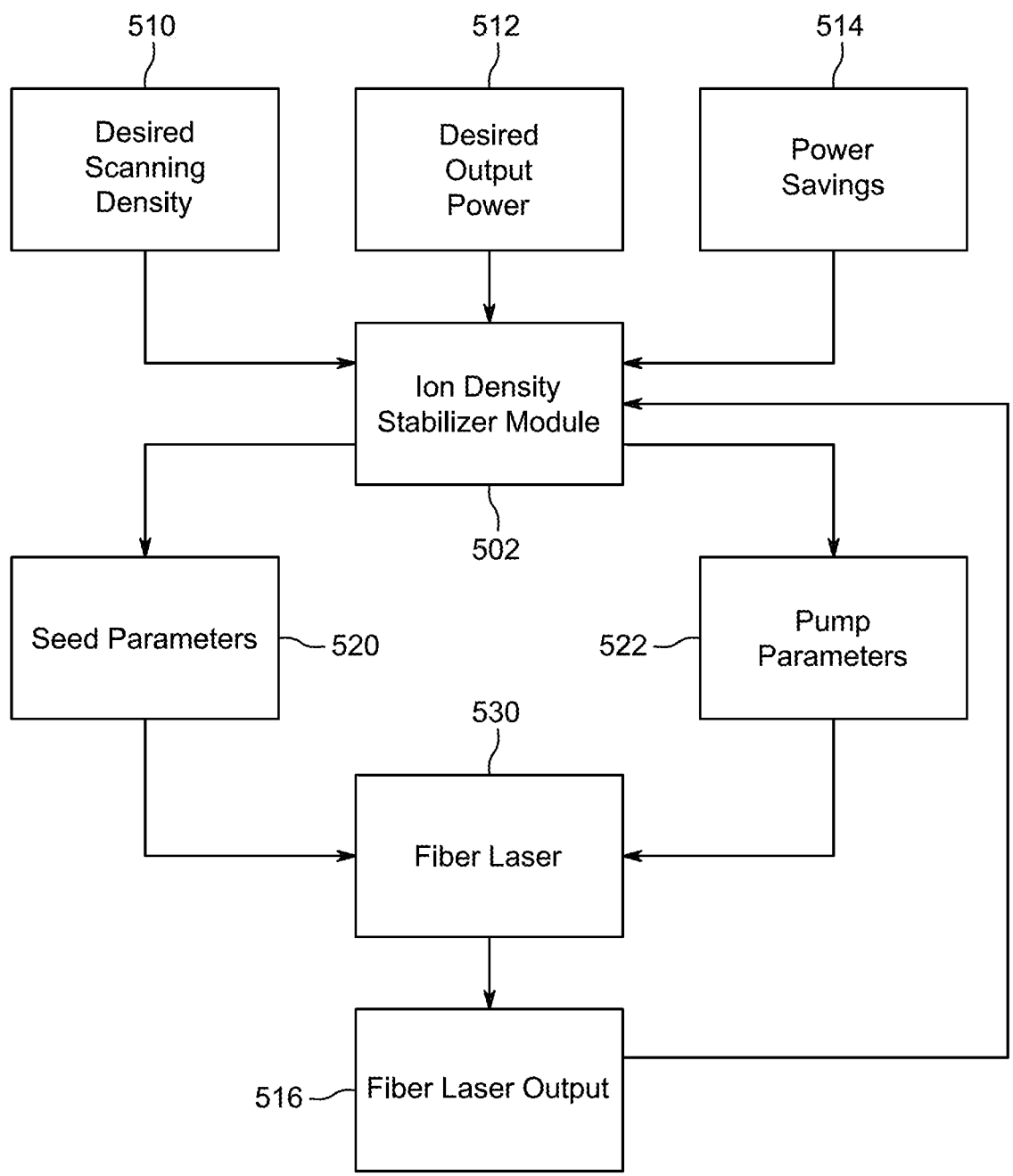
FIG. 5 shows an illustrative block diagram of fiber laser control system according to embodiment.

FIG. 5 shows an illustrative block diagram of fiber laser control system 500 according to embodiment. System 500 may be representative of an algorithm that is executed by control circuitry (e.g., control circuitry 450). As shown, system 500 can include an ion density stabilizer (IDS) module 502, which may receive inputs such as desired scanning density 510, desired output power 512, power savings 514, and fiber laser output 516. Desired scanning density 510 may represent the repetition rate at which light pulses are emitted from fiber laser 530. For example, the LiDAR system may desire to scan different portions of the field of view at different scanning rates. Thus, depending on where within the field of view the scanning system is, a different scanning rate may be required. IDS module 502 can receive the desired scanning rate and nearly instantaneously cause fiber laser 530 to operate at the desired scanning rate without affecting the power output. Desired output power 512 is self-explanatory and indicates a desired output power of the light energy exiting fiber laser 530. Power savings 514 may represent time frames during which the output power of fiber laser 516 can be reduced to a minimum power level. For example, when the LiDAR system is pointing to area of no interest (e.g., the sky), the power level can be reduced to a minimum power level when such areas are being scanned, and the power level of fiber laser 530 can be increased to the desired power level.

Figure 6A:
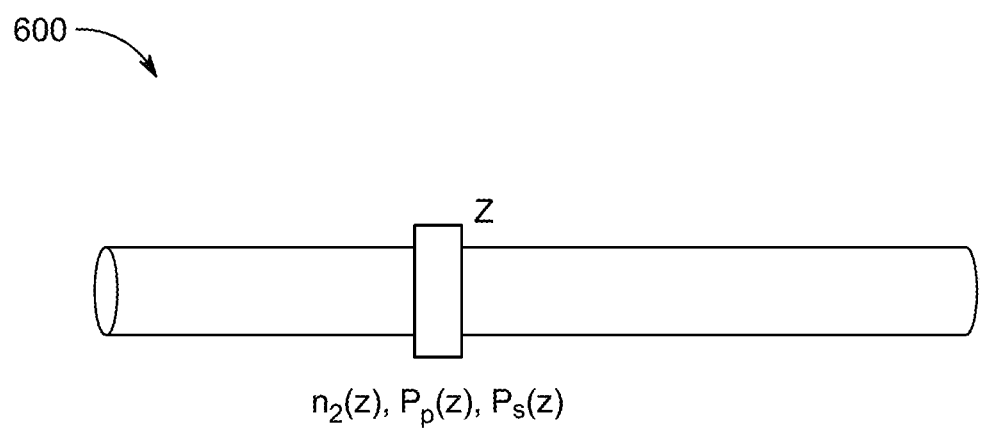
FIG. 6A shows an illustrative representation of fiber amplifier according to an embodiment.

IDS module 502 may output seed parameters 520 and pump parameters 522 to fiber laser 530. In particular, seed parameters 530 may be provided to seed driver circuitry (e.g., circuitry 430 of FIG. 4) and pump parameters 522 may be provided to pump driver circuitry (e.g., circuitry 440 of FIG. 4). Fiber laser 530 may operate in response to seed parameters 520 and pump parameters 522 supplied by IDS module 502. Seed parameters 520 can include repetition rate, pulse duration, and signal input (seed) power (to the seed laser) and pump parameters 522 can include pump power. IDS module 502 is operative to control repetition rate, pulse duration, signal input power, and pump power to maintain the ion density of fiber laser 530 relatively constant with time. By keeping the excited state ion density relatively constant with time, the output power can be changed instantaneously on a pulse-to-pulse basis (while maintaining a fixed repetition rate) and the repetition rate can be changed to a desired rate (while maintaining a desired peak power output). As explained below, the excited state ion density is kept relatively constant by proportionally varying seed and pump power FIG. 6A shows an illustrative representation of fiber amplifier 600 according to an embodiment. For a fiber length, z, the excited state ion density, pump power, and input signal power are represented by $n_2(z)$, $P_p(z)$, and $P_s(z)$, respectively. FIG. 6B shows several equations illustrating rate equations of fiber amplifiers. Nt is total ion number, N2 is excited state ion number, and N1 is ground state ion number. $\Gamma_p$, $\sigma$, $a_p$, h, $\gamma_p$ are the fraction of pump power within the doped core, transition cross section at pump frequency, mode area of pump inside the core, plank constant, and pump frequency, respectively. $\Gamma_s$, $\sigma_{se}$, $\sigma_{sa}$, $a_s$, $\gamma_s$ are the fraction of signal power within the doped core, emission cross section at signal frequency, absorption cross section at signal frequency, mode area of signal inside the core, and signal frequency, respectively. T1 is lifetime of erbium-dope ion, $k_p$ is the pump power constant, $k_{se}$ is signal emission constant, and $k_{sa}$ is signal absorption constant. The ion density ($n_2$) is solved in equation 1. The ion density is sometimes referred to as population inversion. The rate of change of pump power relative to fiber length ($dP_p/d_z$) is defined in equation 2. The rate of change of signal power relative to fiber length ($dP_s/d_z$) is defined in equation 3.

FIG. 6C shows another set of equations that may be used to control instantaneous changes in output power of a fiber laser. Equations 4-6 represent control functions of a rare-earth doped amplifier. Equation 4 represents ion density as a function of time, equation 5 is the same as equation 2, and equation 6 is the same as equation 3. To realize pulse-to-pulse instantaneous change in high peak power to low peak power or vice versa, the ion density ($n_2$) must be substantially constant over time. Based on this requirement, equation 7 is provided, which shows that $n_1$ and $n_2$ are constant. As result of the constant ion density, pump power $P_p$ is a function of signal power $P_s$, and vice versa, as shown in equation 8. Equation 8 shows that any changes to seed and pump power are not limited by the relaxation time of the ion density.

IDS module 502 may use equations 1-3 or equations 4-8 to determine seed and pump parameters 520 and 522. For a given set of inputs (e.g., desired scanning density 510, desired power output 512, and power savings 514), IDS module 502 modifies the seed and pump parameters to ensure that the excited state ion density remains relatively constant over time.

Figure 7A:
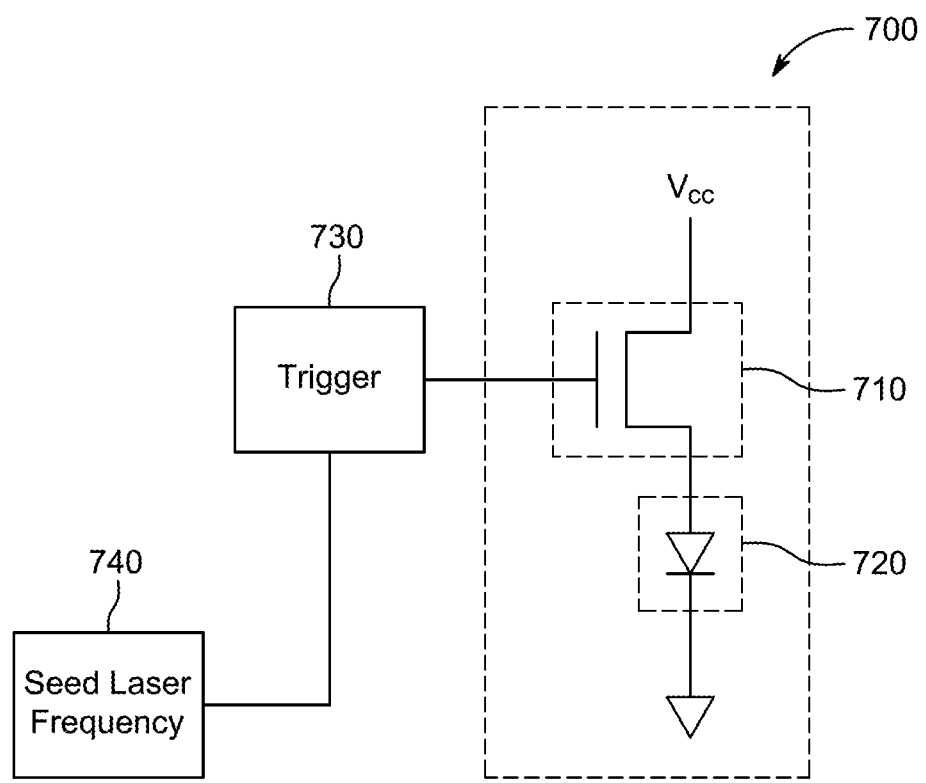
FIG. 7A shows an illustrative circuit diagram of pump driving circuitry according to an embodiment.

FIG. 7A shows an illustrative circuit diagram of pump driving circuitry 700 according to an embodiment. Pump driving circuitry 700 can include switch 710 and pump diode 720. One terminal of switch 710 may be coupled to a power source (shown as Vcc), a second terminal can be coupled to pump diode 720, and a third terminal is coupled to trigger source 730 (e.g., IDS module 502). Pump diode 720 may be coupled to a ground source. Trigger source 730 may follow the seed laser frequency (shown as box 740) as the frequency operation of diode 720 tracks the seed laser frequency. Trigger source 730 may control the ON/OFF duty cycle of switch 710 to control the amount of power emitted by pump diode 720.

Figure 7B:
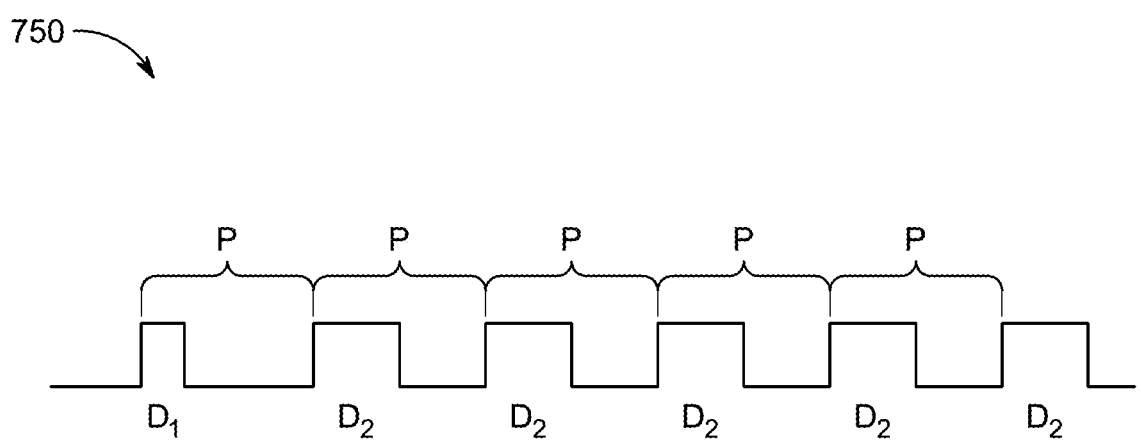
FIG. 7B shows an illustrative trigger signal that may be supplied by trigger source, according to an embodiment.

FIG. 7B shows an illustrative trigger signal 750 that may be supplied by trigger source 730. The frequency of trigger signal 750 may be the same or substantially the same as the frequency of the seed signal. The period of each ON/OFF duty cycle is shown as P, and the ON portion of each ON/OFF duty is shown D1 or D2, where D1 is less than D2. When less power is needed, trigger source 730 may set the duty cycle to D2, and when more power is needed, trigger source 730 may set the duty cycle to D2. That time gap between a falling edge of signal 750 and the subsequent rising edge is less than a fixed period of time (e.g., 2 μs) so that fiber laser does experience in a drop in energy levels (e.g., energy level 2 to level 1 of FIG. 2).

Figure 8:
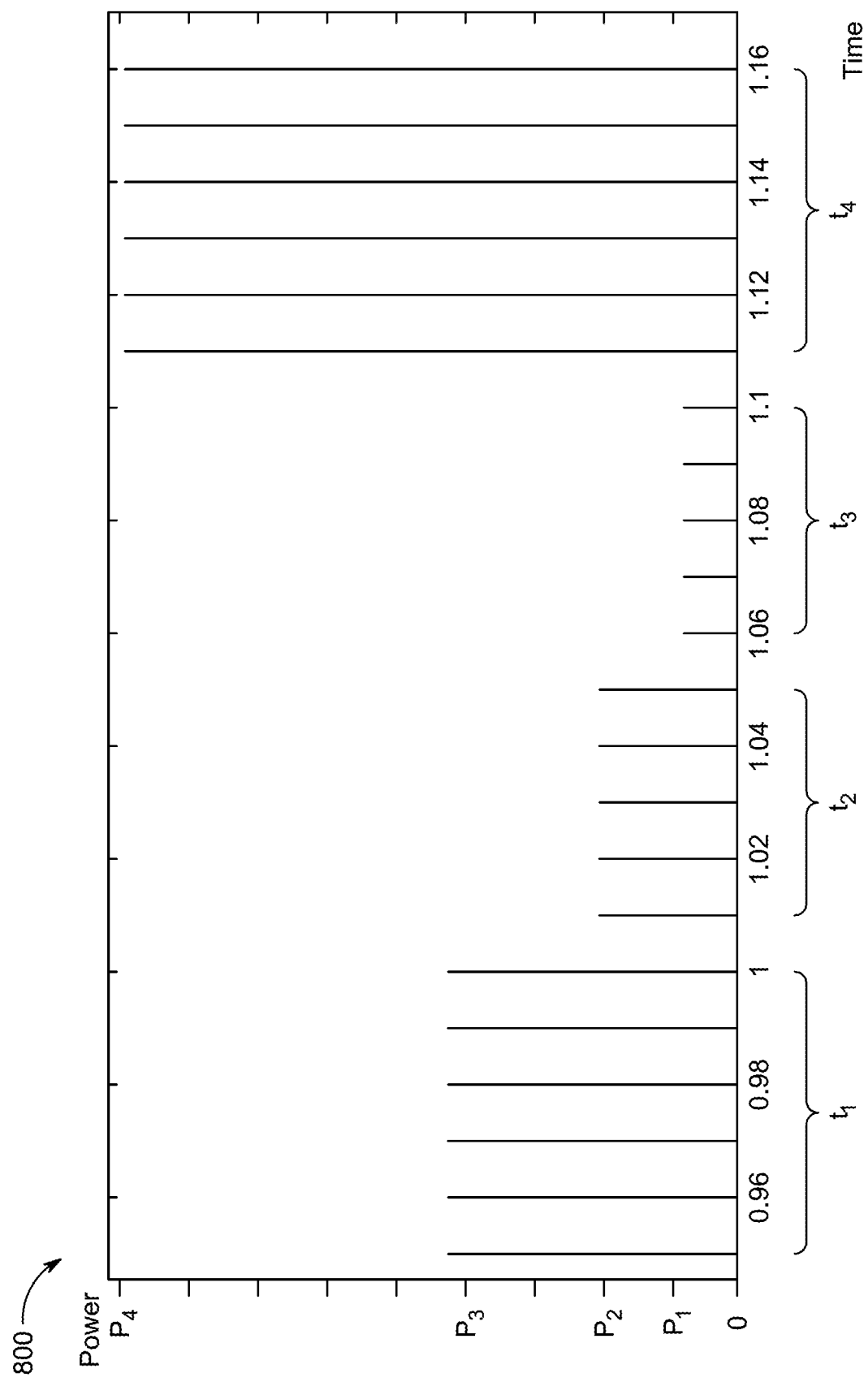
FIG. 8 shows illustrative timing diagram of fiber laser output power as a function of time, according to an embodiment.

FIG. 8 shows illustrative timing diagram 800 of fiber laser output power as a function of time, according to an embodiment. In particular, timing diagram 800 shows fiber output laser power on a pulse-to-pulse basis. At time range, t1, the output peak power is at power level, p3. During the transition from time range t1 to time rage t2, the output peak power changes instantaneously from power level p3 to p2. The step change in power levels occurs within one pulse period. Similarly, during the transition from time range t2 to time range t3, the output peak power changes instantaneously from power level p2 to p1. During the transition from time range t3 to time range t4, the peak power changes instantaneously from power level p1 to p4. Each of the power transitions occurs within one pulse period. In some embodiments, the pulse period is on the order of 0.001 milliseconds. Such substantial instantaneous changes in output power is achieved by IDS module 502's ability to simultaneously change seed power and pump power such that excited state ion density remains relatively constant over time.

Figure 9:
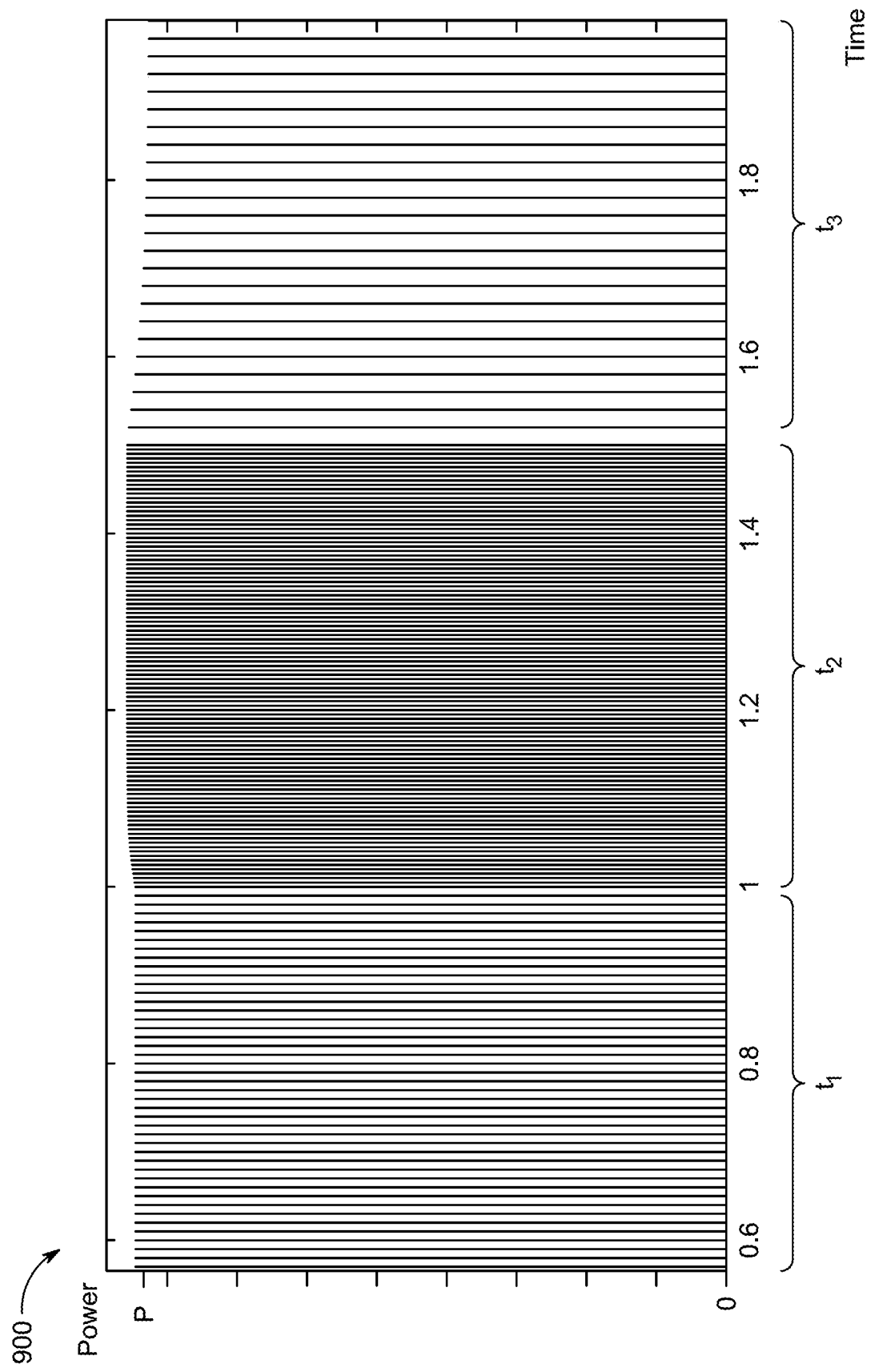
FIG. 9 shows illustrative timing diagram of variable repetition rates as a function of time according to an embodiment.

FIG. 9 shows illustrative timing diagram 900 of variable repetition rates as a function of time according to an embodiment. The time range, t1, shows that the repetition rate is operating at a first frequency and the output peak power is at power level P. The repetition rate may be changed to obtain the desired scanning density or resolution (e.g., which is set by desired scanning density 510). At the transition from time range t1 to time range t2, the scanning density increases as the repetition rate increases to a second frequency, which is greater than the first frequency. The output peak power level remains relatively constant at power level P during the transition from time range t1 to time range t2 and throughout time range t2. The ratio between average output power at time range t2 and time range t1 is the same as that of repetition rate at time range t2 and time range t1. At the transition from time range t2 to time range t3, the scanning density decreases as the repetition rate decreases to a third frequency, which is less than the first frequency. The power output level remains relatively constant at power level P during the transition from time range t2 to time range t3 and throughout time range t3. The ratio between average output power at time range t3 and time range t2 is the same as that of repetition rate at time range t3 and time range t2.

Figure 10:
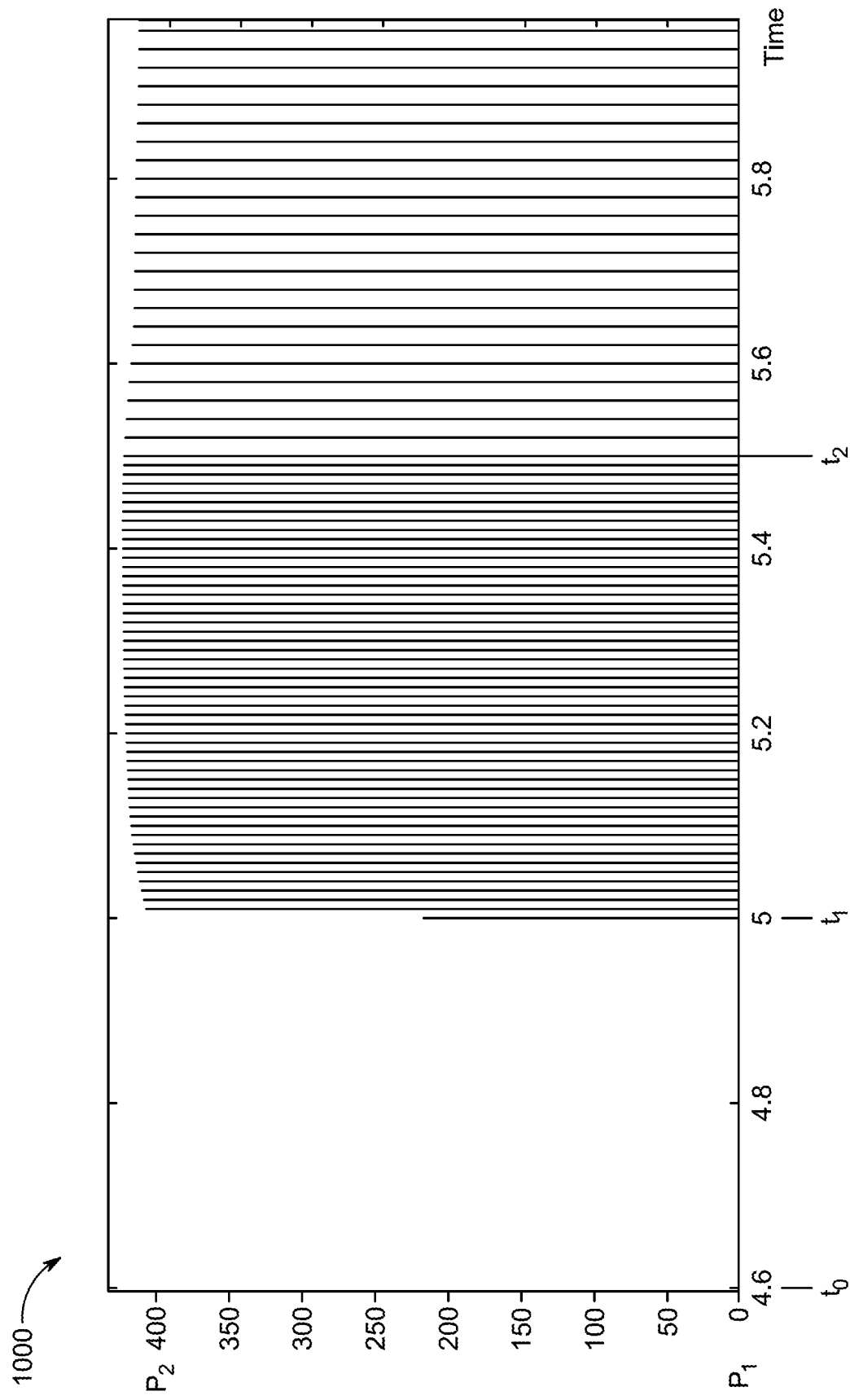
FIG. 10 shows illustrative timing diagram of power savings according to an embodiment.

FIG. 10 shows illustrative timing diagram 1000 of power savings according to an embodiment. At time, t0, the pump power is set at a certain level, so that the output level of the fiber laser is maintained at a minimum power output, p1, and the excited state ion density can be maintained relatively constant over time. In some embodiments, the scanning system may directed to an area of non-interest between time t0 and time t1, and as such, there is no need to waste power scanning said area. At time, t1, output power of the fiber laser transitions from minimum power to maximum power, p2. As shown, the transition from minimum power to maximum power occurs within one pulse period. The repetition rate of fiber laser between times t1 and t2 may operate at a first frequency. At time t2, the fiber laser's repetition rate may change to a second frequency, which is shown to be less than the first frequency, while maintaining output peak power at a substantially constant level.

Figure 11A:
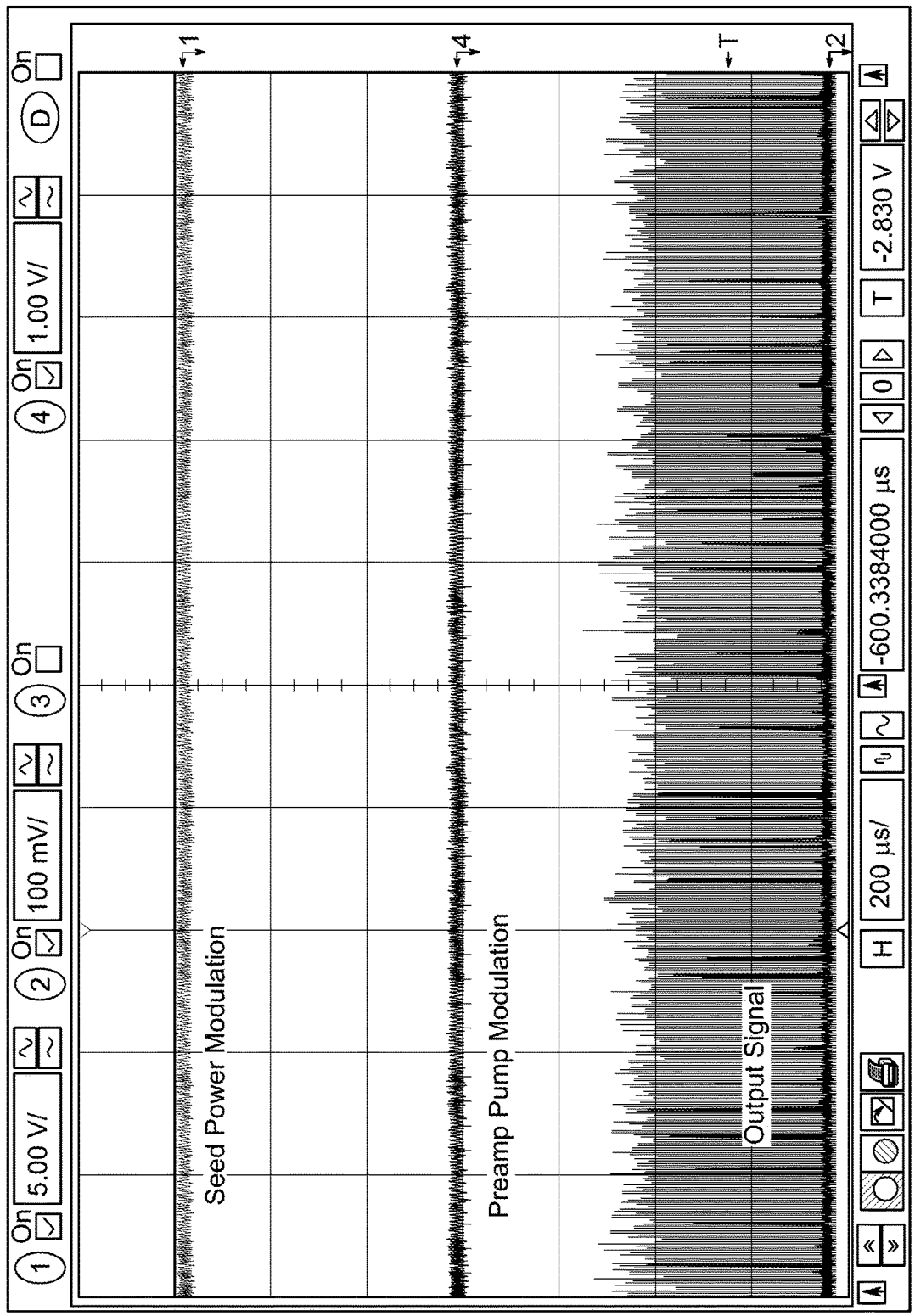
FIGS. 11A-11F show different illustrative timing diagrams showing how seed power modulation and pump modulation can control fiber laser output according to various embodiments.
Figure 11B:
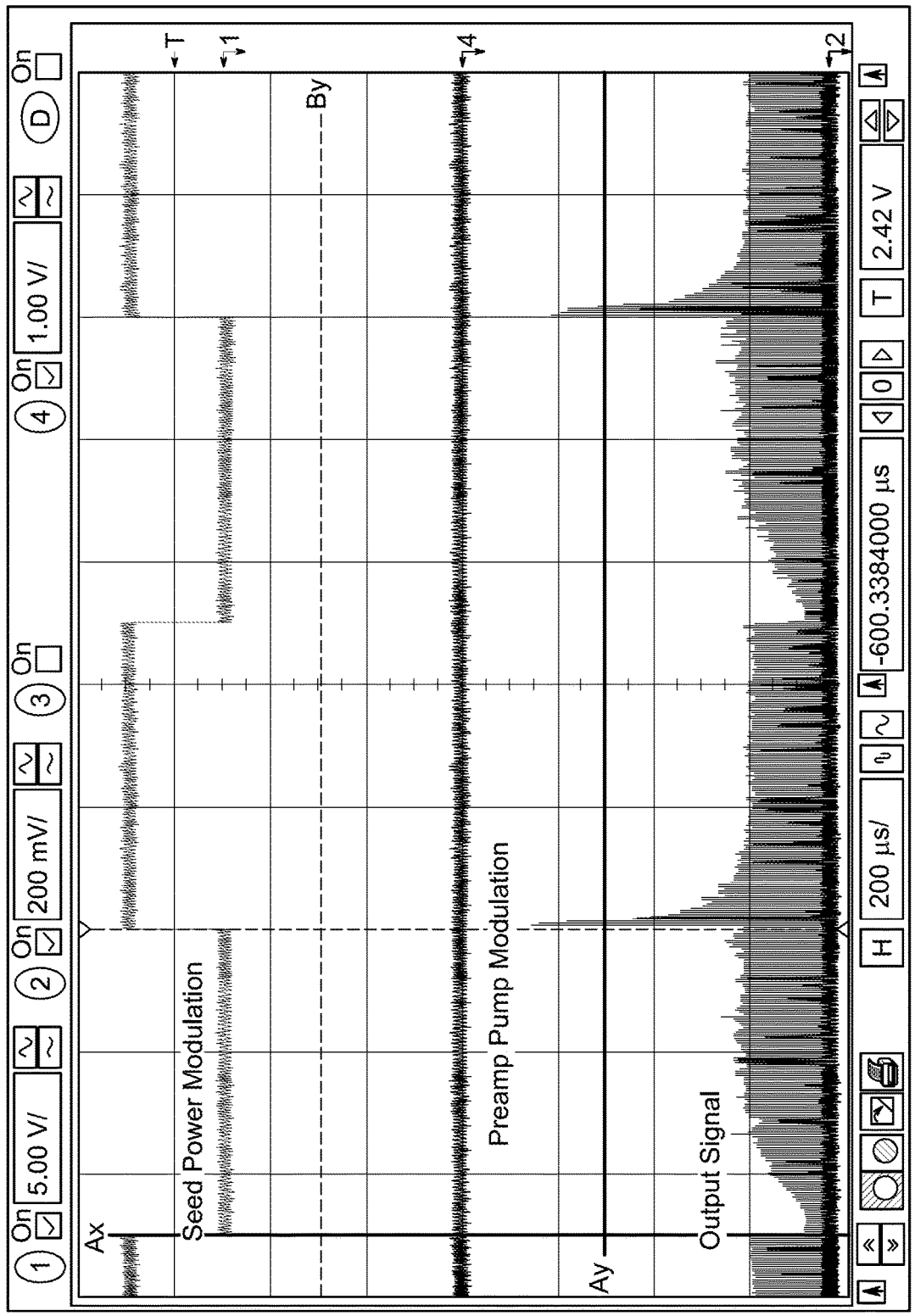
Figure 11C:
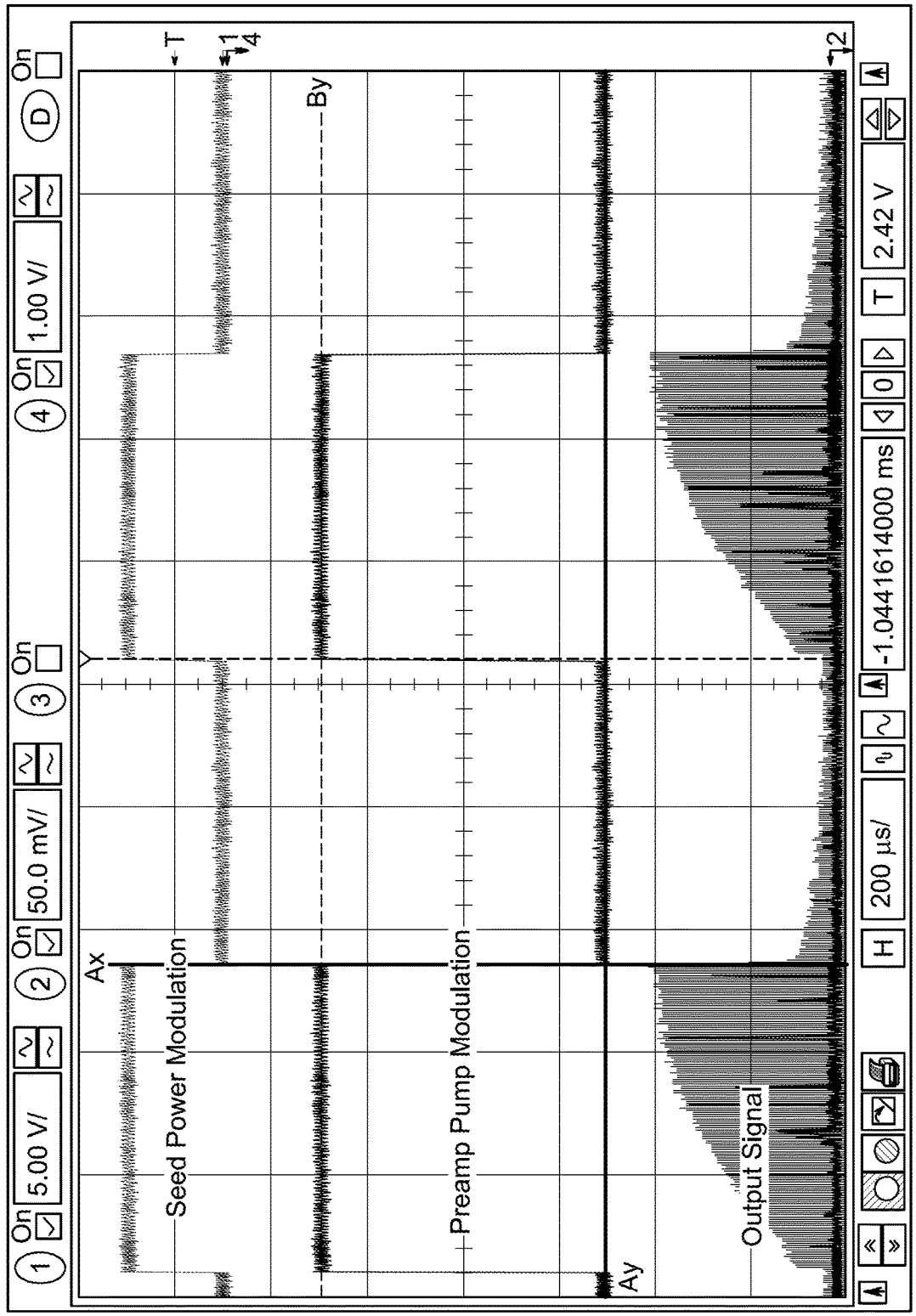

FIGS. 11A-11F show different illustrative timing diagrams showing how seed power modulation and pump modulation can control fiber laser output according to various embodiments. The timing diagrams were generate using a seed operating at 1550 nm wavelength, having a 4 ns pulse duration at a 1 MHz repetition rate. FIG. 11A shows that when neither the seed power nor pump power are modulated, the peak power of output pulses remains relatively constant. FIG. 11B shows the output signal when only the seed power is modulated. As shown, a relaxing or a spiking of peak power occurs at the switch transitions. FIG. 11C shows the output signal when both seed power and pump power are modulated, but the proportional ratio between the seed and pump is out of balance. As a result, the ion density is not being maintained constant over time. This results in relaxed changes in peak power after each switch event. The timing diagrams in FIGS. 11B and 11C illustrated undesired output results.

Figure 11D:
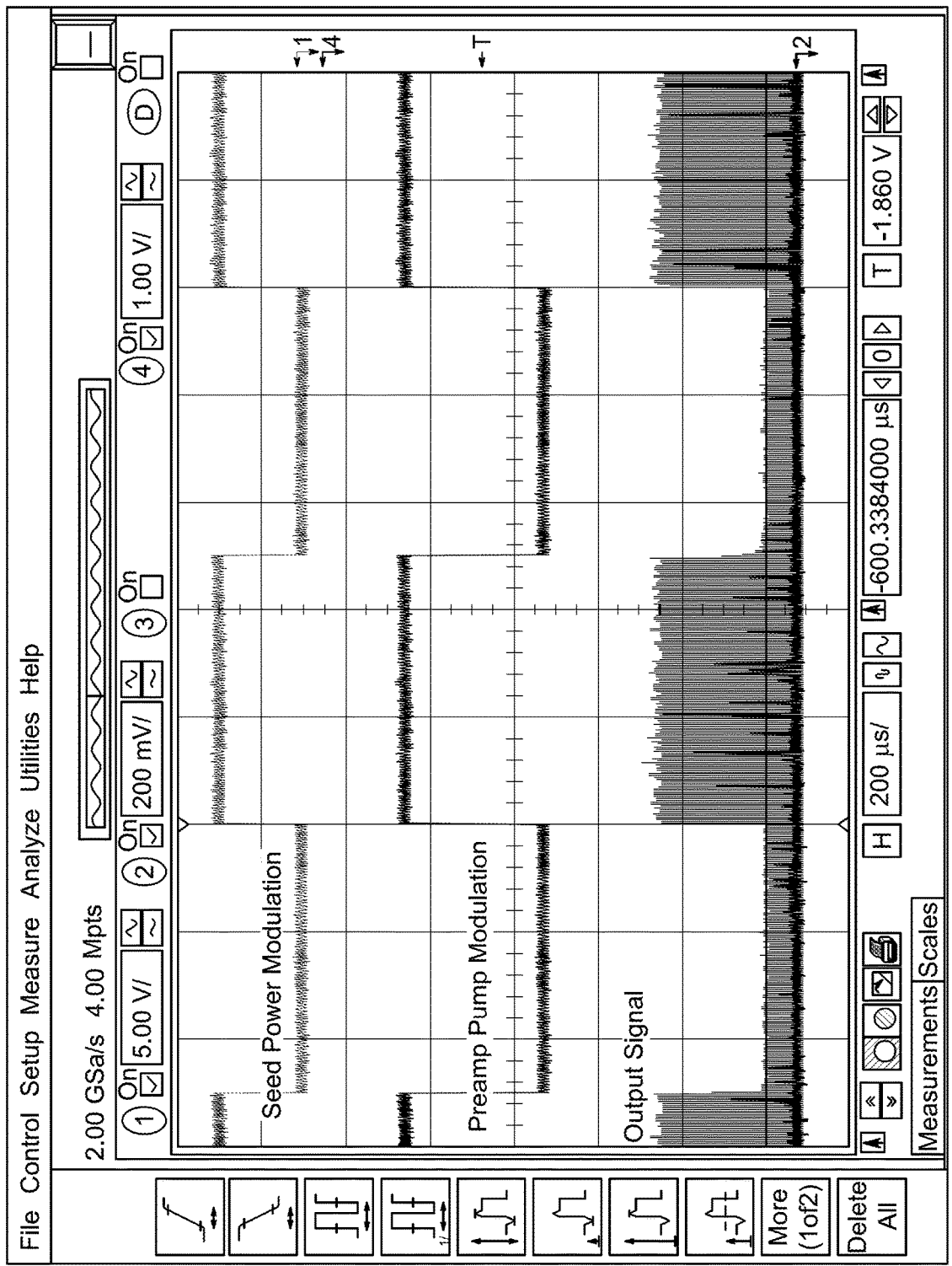
Figure 11E:
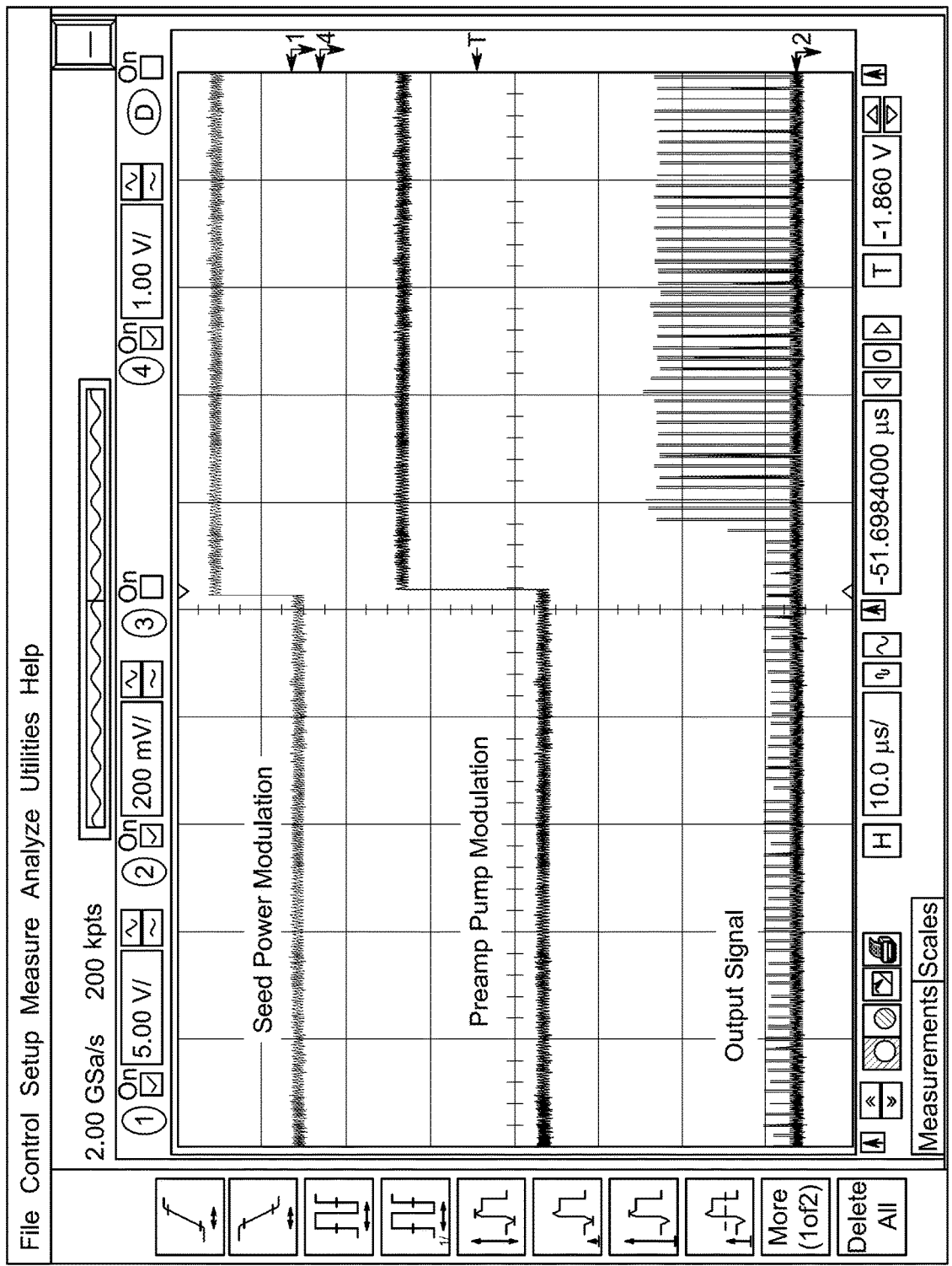
Figure 11F:
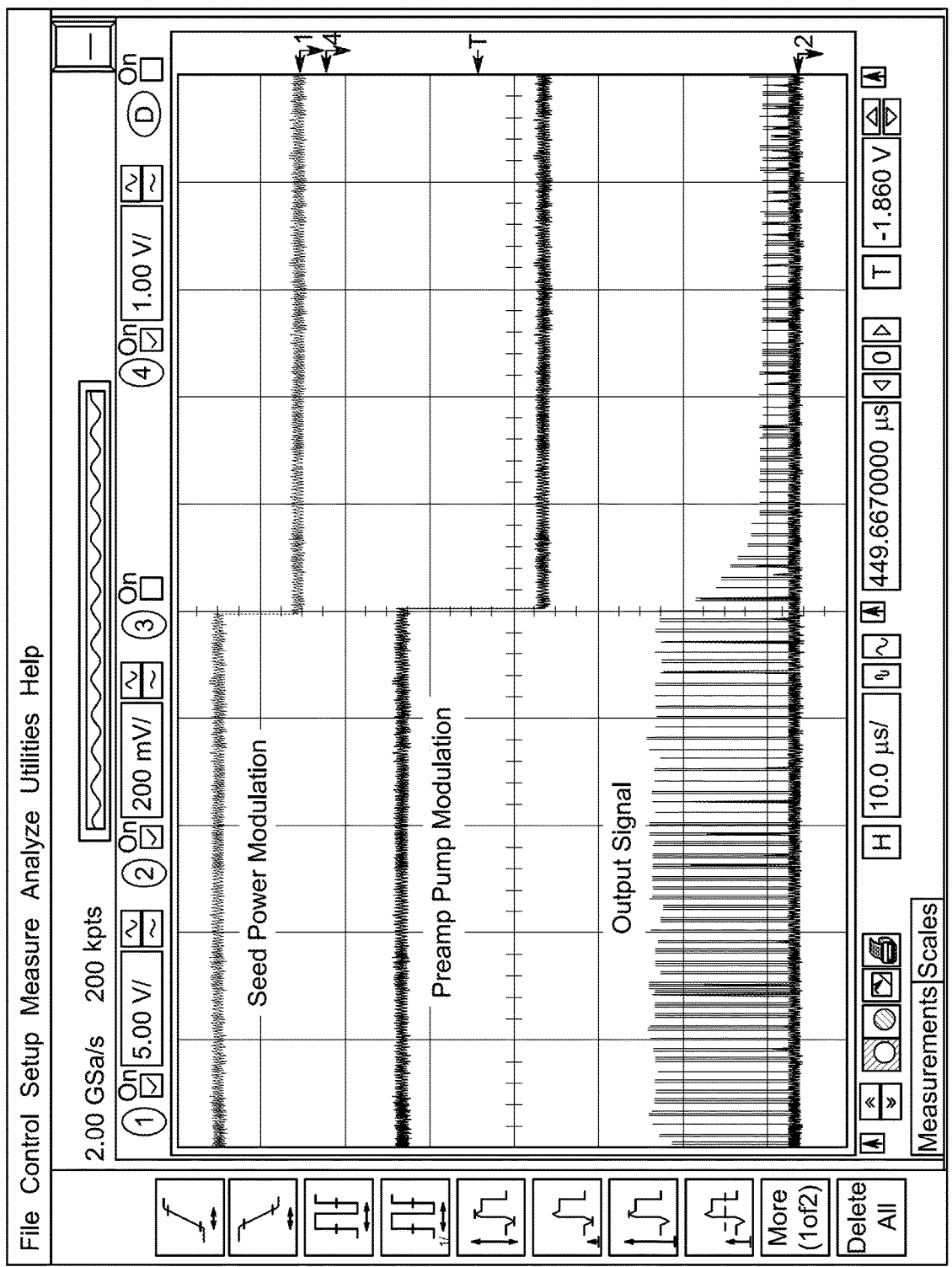

FIGS. 11D-11F shows desired output results. The desired output results are achieved by optimizing the ratio between the seed and pump such that the ion density remains constant. It was found that the rise time transitions in peak power were not limited by the erbium-dope ion transition, but was limited by the modulation bandwidth of the seed and pump drivers, which is about 1-2 μs. The fall time transition was found to be less than 10 μs, which is about 1000 times faster than the response time of the erbium-dope ion transition. FIG. 11D illustrates multiple switches between low and high peak power levels. FIG. 11E illustrates a rise transition and FIG. 11F illustrates a fall transition.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-10, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system, comprising:
    a fiber laser having an excited state ion density and comprising:
        a seed laser; and
        a pump;
    seed driver circuitry coupled to the seed laser;
    pump driver circuitry coupled to the pump; and
    control circuitry coupled to the seed driver circuitry and the pump driver circuitry, the control circuitry operative to control operation of the seed driver circuitry and the pump driver circuitry to maintain the excited state ion density substantially constant over time by proportionally varying seed laser power and pump power such that the seed laser power and the pump power are balanced during an instantaneous change in output power or repetition rate, the output power being changeable within an output power range from a minimum output power to a maximum output power.

2. The LiDAR system of claim 1, wherein the control circuitry executes an ion density stabilization algorithm to generate seed parameters that are used to control the seed driver circuitry and pump parameters that are used to control the pump driver circuitry.

3. The LiDAR system of claim 2, wherein the control circuitry receives a plurality of inputs that are provided to the ion density stabilization algorithm.

4. The LiDAR system of claim 1, wherein by maintaining the excited state ion density substantially constant over time, the output power is changeable to any output power level within the output power range on a pulse-to-pulse basis.

5. The LiDAR system of claim 1, wherein by maintaining the excited state ion density substantially constant over time, a repetition rate of the fiber laser is changeable to any pre-configured repetition rate on a pulse-to-pulse basis.

6. The LiDAR system of claim 5, wherein an output pulse peak power level of the fiber laser remains substantially constant when the repetition rate changes.

7. The LiDAR system of claim 1, wherein in a power saving mode, the control circuitry is operative to set a level of the pump power such that the output power is at the minimum output power and that the excited state ion density remains substantially constant over time.

8. A light detection and ranging (LiDAR) system, comprising:
    a fiber laser having an excited state ion density and comprising:
        a seed laser; and
        a pump;
    seed driver circuitry coupled to the seed laser and operative to control seed power;
    pump driver circuitry coupled to the pump and operative to control pump power; and
    control circuitry coupled to the seed driver circuitry and the pump driver circuitry, wherein the control circuitry is operative to control a ratio between the seed power and the pump power such that the excited state ion density is maintained substantially constant over time by proportionally varying seed laser power and pump power such that the seed laser power and the pump power are balanced during an instantaneous change in output power or repetition rate, the output power being changeable within an output power range from a minimum output power to a maximum output power.

9. The LiDAR system of claim 8, wherein the control circuitry is operative to simultaneously modulate the seed power and the pump power to produce a desired peak output power of the fiber laser.

10. The LiDAR system of claim 8, wherein the ratio is maintained during changes in peak output power of the fiber laser.

11. The LiDAR system of claim 8, wherein a low peak power to high peak power transition is not time limited by a response time of an erbium-dope ion transition of the fiber laser.

12. The LiDAR system of claim 8, wherein a high peak power to low peak power transition is not time limited by a response time of an erbium-dope ion transition of the fiber laser.

13. The LiDAR system of claim 12, wherein the high peak power to low peak power transition is performed in less than 10 μs.

14. The LiDAR system of claim 8, wherein the ratio is defined in the following equation:

$$P_p = P_p(P_s) = \frac{1}{k_p(1-n_2)}[(\kappa_{se}+\kappa_{sa})\cdot n_2 - \kappa_{sa}]P_s$$

wherein Pp is the pump power, Ps is the seed power, $n_2$ is the excited state ion density, $k_p$ is a pump power constant, $k_{se}$ is a signal emission constant, and $k_{sa}$ is a signal absorption constant.

15. A method implemented in a light detection and ranging (LiDAR) system comprising a fiber laser comprising a seed laser and a pump, the method comprising:
    modulating seed laser power of the seed laser;
    modulating pump power of the pump; and
    controlling a ratio between the seed laser power and the pump power such that an excited state ion density of the fiber laser is maintained substantially constant over time by proportionally varying seed laser power and pump power such that the seed laser power and the pump power are balanced during an instantaneous change in output power or repetition rate, the output power being changeable within an output power range from a minimum output power to a maximum output power.

16. The method of claim 15, wherein by maintaining the excited state ion density substantially constant over time, the output power is changeable to any output power level within the output power range without being time impacted by a response time of an erbium-dope ion transition of the fiber laser.

17. The method of claim 15, wherein the seed laser and the pump are simultaneously modulated while maintaining the ratio.

18. The method of claim 15, further comprising:
    receiving a desired peak power output for the fiber laser; and adjusting the seed laser power and the pump power, while maintaining the ratio, in response to receipt of the desired peak power output for the fiber laser.

19. The method of claim 15, further comprising maintaining the ratio during changes in peak output power of the fiber laser.

20. The system of claim 1, wherein the output power is changeable within the output power range according to a scan area of the LiDAR system.

21. The system of claim 8, wherein the output power is changeable within the output power range according to a scan area of the LiDAR system.

22. The method of claim 15, wherein the output power is changeable within the output power range according to a scan area of the LiDAR system.

* * * * *